United States Patent [19]

Boryta

[11] 3,920,803

[45] Nov. 18, 1975

[54] OXYGEN-GENERATING GRANULES

[75] Inventor: Daniel A. Boryta, Downingtown, Pa.

[73] Assignee: Foote Mineral Company, Exton, Pa.

[22] Filed: Oct. 20, 1972

[21] Appl. No.: 299,286

[52] U.S. Cl. .................. 423/579; 23/281; 252/186; 252/188.3 R; 423/225; 423/230
[51] Int. Cl............................................. C01b 13/02
[58] Field of Search...... 252/186, 188.3 R; 423/225, 423/230, 582, 579; 23/281

[56] References Cited
UNITED STATES PATENTS

| 3,174,936 | 3/1965 | Gustafson et al. | 252/186 |
| 3,175,979 | 3/1965 | Markowitz | 252/186 |
| 3,728,988 | 4/1973 | Shapero et al. | 252/186 |
| 3,773,680 | 11/1973 | Huebler et al. | 252/186 |

Primary Examiner—Benjamin R. Padgett
Assistant Examiner—Irwin Gluck
Attorney, Agent, or Firm—Howson and Howson

[57] ABSTRACT

Solid, oxygen-generating granules of catalyzed lithium peroxide containing a non-oxidizable, hygroscopic agent for use in closed cycle life support systems.

9 Claims, No Drawings

OXYGEN-GENERATING GRANULES

BACKGROUND OF THE INVENTION

Alkali metal oxides and peroxides are widely utilized as life support media. For example, potassium superoxide ($KO_2$), sodium superoxide ($NaO_2$), lithium peroxide ($Li_2O_2$), and the like, have been utilized to absorb carbon dioxide and water vapor from environments where their presence is inimical to life such as gas anesthesia systems, manned space vehicles, subterranean mining environments, and the like. Life support media may also evolve oxygen, a life supporting gas, as they abosrb carbon dioxide and moisture from closed cycle environmental system.

In many environmental systems, it is desirable to utilize solid, particulate life support media. Solid, particulate material, such as potassium superoxide and sodium superoxide, readily absorb carbon dioxide and water vapor in an environmental system evolving oxygen as the carbon dioxide combines with the potassium or sodium superoxide. While potassium and sodium superoxide are utilized as a solid, granular life support media, they have an inherent disadvantage for use in closed cycle life support systems. Potassium and sodium superoxide are deliquescent materials; thus, as they absorb water vapor and carbon dioxide from environmental systems, they decompose into their respective hydroxides and carbonates. Since the hydroxides and carbonates are relatively soluble compounds the solid, particulate bed of material rapidly degenerates into a solution phase before the capacity of the potassium or sodium superoxide to absorb carbon dioxide and yield oxygen is depleted. On the other hand, solid, particulate lithium peroxide granules will absorb carbon dioxide and some water vapor from a closed cycle life support system, evolving only small amounts of oxygen even when a suitable peroxide decomposition catalyst is included in the lithium peroxide granules. The reason for this is thought to lie in the non-hygroscopic nature of solid, granular lithium peroxide and the fact that solid, particulate lithium peroxide decomposes, even in the presence of a solid catalyst, into solid intermediates such as lithium hydroperoxide and lithium percarbonate, compounds which do not readily release their oxygen.

It is the object of this invention, therefore, to provide solid, particulate life support media which will absorb metabolic carbon dioxide and water vapor in a closed cycle life support system with the evolution of sufficient oxygen to support life while remaining in solid, particulate form.

It is also an object of this invention to provide solid, oxygen generating granules which will absorb metabolic carbon dioxide and water vapor in a closed cycle life support system with the evolution of sufficient oxygen to support life.

Another object of this invention is to provide solid, oxygen generating granules comprising a mixture of lithium peroxide, a peroxide decomposition catalyst and a non-oxidizable, hygroscopic agent.

DETAILED DESCRIPTION OF THE INVENTION

This invention relates to solid, oxygen generating granules for use in closed cycle life support systems comprising a mixture of lithium peroxide, a peroxide decomposition catalyst comprising a heavy metal or compound thereof and a non-oxidizable hygroscopic agent capable of forming a liquid phase in said granules upon the abosrption of water vapor, said lithium peroxide being catalytically decomposed in said liquid phase with the evolution of oxygen and abosrption of carbon dioxide and water vapor.

It has now been found that inclusion of a non-oxidizable hygroscopic agent in solic, oxygen generating granules provides a life support media which is capable of absorbing water vapor and carbon dioxide in closed cycle life support systems while evolving oxygen in amounts sufficient to support life.

Lithium peroxide is utilized as the oxygen generating life support media in this invention. Lithium peroxide is prepared by well known procedures. For example, lithium peroxide powder can be prepared in a procedure in which an aqueous slurry of hydgrogen peroxide and solid lithium hydroxide is permitted to react forming a precipitate of lithium hydroperoxide hydrate which is separated from the solution and dried. Lithium peroxide powder is non-hygroscopic, relatively porous and functions in closed cycle life support systems as a chemical absorbent for carbon dioxide. Lithium peroxide will react with water vapor present in a life support system in a very slow manner evolving only small amounts of oxygen which are insufficient to support life. A peroxide decomposition catalyst and a non-oxidizable, hygroscopic agent are combined with lithium peroxide, the mixture being formed into solid, particulate granules, to increase the rate and amount of oxygen evolved by lithium peroxide during the absorption of carbon dioxide and water vapor in a closed cycle, life support system.

The peroxide decomposition catalyst and the non-oxidizable, hygroscopic agent may be pre-mixed prior to admixture with the lithium peroxide or they may be combined with the lithium peroxide individually in any convenient order.

As noted above, in forming the environmental support granules of this invention, lithium peroxide is admixed with a peroxide decomposition catalyst. The peroxide decomposition catalyst may be a heavy metal or heavy metal compound, such as heavy metal oxides, capable of catalytically decomposing peroxides. Useful heavy metal decomposition catalysts include nickel, tin, tungsten, zinc, manganese, cobalt, iron, lead, titanium and compounds of these metals such as manganese sesquioxide. The heavy metal or heavy metal compound should be finely divided, e.g., less than 25 microns, when combined with lithium peroxide forming the oxygen generating granules of this invention.

A non-oxidizable, hygroscopic agent is also incorporated in the solid, oxygen generating granules. The term "non-oxidizable, hygroscopic agent" refers to hygroscopic agent which is stable and does not react with lithium peroxide. Lithium chloride is the preferred non-oxidizable, hygroscopic agent utilized in this invention although other hygroscopic metal chlorides such as cesium chloride, magnesium chloride and calcium chloride as well as potassium, sodium and cesium hydroxides may be utilized.

The solid, oxygen generating granules are formed by admixture of lithium peroxide with from about 1 to about 10 percent, preferably from about 3 to about 7 percent, of the peroxide decomposition catalyst and from about 1 to about 10 percent, preferably from about 3 to about 7 percent of the non-oxidizable, hygroscopic agent, said percentages being by weight, based on the weight of the oxygen generating granules.

Mixture of these components may be accomplished in any convenient manner such as by simple mechanical mixture of the components.

After admixture of the lithium peroxide with the peroxide decomposition catalyst, and the non-oxidizable, hygroscopic agent, until a uniform blend is achieved, the mixture is compressed into briquettes with sufficient pressure to provide briquetted material having a density of from about 0.7 to about 0.9, preferably about 0.8 g. per cm³. The briquetted mixture is then reduced in particle size to obtain solid, oxygen-generating granules having an average particle size of between about 4 mesh and about 14 mesh which are utilized as the life support media of this invention.

The solid, oxygen-generating granules of this invention may also be formed in another particularly preferred method. In this method, the peroxide decomposition catalyst and the non-oxidizable, hygroscopic agent are combined in an aqueous slurry, dried and ground to a finely-divided state, viz. 5 microns or less. The finely-divided mixture is then combined with lithium peroxide, briquetted, crushed and formed into solid, oxygen generating granules.

More particularly, in the method outlined above, a peroxide decomposition catalyst and a non-oxidizable, hygroscopic agent are combined in any proportion ranging from 1 part of the former to 10 parts of the latter to 10 parts of the former to 1 part of the latter, said parts being by weight, based on the weight of the combined mixture and slurried in sufficient water to dissolve the hygroscopic agent. The resultant slurry is then dried at a temperature ranging from 100° to 150°C. under vacuum and the resultant mixture is finely ground to obtain particles 5 microns, or less, in size.

Solid, oxygen generating granules are prepared by mixing lithium peroxide with from about 1 to about 10 percent, preferably from about 3 to about 7 percent, by weight, based on the weight of the granules of the finely-ground peroxide decomposition catalyst-non-oxidizable hygroscopic agent mixture until a uniform blend is achieved, compressing the blend into briquettes with sufficient pressure to provide briquetted material having a density of from about 0.7 to about 0.9, preferably about 0.8 g. per cm³, and reducing the briquetted material to obtain solid, oxygen generating granules having an average particle size of between about 4 and about 14 mesh.

The solid, oxygen generating granules of this invention may be utilized in a variety of closed cycle life support systems. For example, the granules can be utilized in gas anesthesia systems. In such a system, the granules absorb metabolic carbon dioxide entering the system from the air expired by a patient to whom an anesthetic has been administered. In addition to the chemical absorption of carbon dioxide, the granules also absorb moisture injected into the life support environment in the form of water vapor in the normal course of respiration of the patient inhabiting the environment. Concurrently with the absorption of carbon dioxide and water vapor from the environmental system, oxygen gas is evolved from the granules in quantities sufficient to provide life support for the patient in the system. While in use in an environmental system, the oxygen-generating granules of this invention remain free flowing and particulate in nature. This fact, coupled with the fact that the lithium peroxide containing granules decompose with the evolution of oxygen and yet remain in a solid granular state is most surprising, and points out the remarkable nature of this invention.

As noted above, solid, particulate lithium peroxide per se is not hygroscopic and while it will absorb metabolic carbon dioxide in an environmental system in its solid state, it does not readily evolve oxygen, even in the presence of a peroxide decomposition catalyst due to the formation of solid peroxide intermediates. By incorporating a non-oxidizable, hygroscopic agent in granules containing lithium peroxide and a peroxide decomposition catalyst, this invention provides for the formation of an intermediate solution phase in the solid lithium peroxide. The solution phase forms as the hygroscopic agent absorbs moisture in the form of water vapor in the environmental system and provides a liquid phase in which the peroxide decomposition catalyst can activate the decomposition of the lithium peroxide with the result that oxygen is evolved during the absorption of metabolic carbon dioxide and water vapor from an environmental life support system. An integral part of this invention is thus the provision of a method for increasing oxygen generated from solid, oxygen generating granules containing lithium peroxide and a peroxide decomposition catalyst during absorption of water vapor and carbon dioxide which comprises incorporating a non-oxidizable, hygroscopic agent in the granules.

The reaction sequence involved with the utilization of the oxygen generating granules of this invention in an environmental life support system, assuming that lithium chloride is utilized as the non-oxidiable hygroscopic agent and that manganese sesquioxide is used as the peroxide decomposition catalyst, may be illustrated in the following manner:

1. $LiCl(s) + H_2O(g) \rightleftarrows LiCl.H_2O(s)$
2. $LiCl.H_2O(s) + 3H_2(g) \rightleftarrows LiCl.4H_2O(soln)$
3. 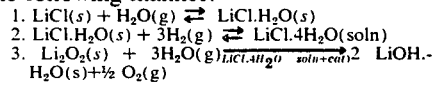 $Li_2O_2(s) + 3H_2O(g) \xrightarrow{LiCl.4H_2O\ soln+cat} 2\ LiOH.H_2O(s) + \tfrac{1}{2} O_2(g)$ 4. 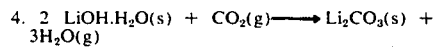 $2\ LiOH.H_2O(s) + CO_2(g) \longrightarrow Li_2CO_3(s) + 3H_2O(g)$ The solid, oxygen generating granules of the present invention can function in a closed cycle life support system to absorb carbon dioxide and water vapor from the life support system and as a by-product serve as the sole source of oxygen in the life support system. For example, in the course of normal respriation, man's respiratory quotient is 0.83 mols of carbon dioxide produced per mol of oxygen consumed. Therefore, to satisfy man's oxygen requirement in a closed cycle life support system utilizing the solid, oxygen generating granules of this invention, 42 percent of the lithium in the granules as lithium peroxide should be converted to lithium carbonate and about 58 percent of the lithium in the lithium peroxide granules should be converted to lithium hydroxide monohydrate. The oxygen generating granules of this invention satisfy man's respiration quotion since the reaction between water vapor in a life support system and the lithium peroxide content of the granules (equation 3 above) can be controlled. The rate of reaction of the lithium peroxide in the granules with water vapor evolving oxygen (equation 3) is partially dependent on the state of equilibrium reached in equation 2, (the combination of the non-oxidizable, hygroscopic agent, lithium chloride and water vapor); thus oxygen evolved in a life support system can be controlled by regulating by well known means the rate at which water vapor in the environmental system is exposed to the granules in the closed cycle system.

The following examples are illustrative of the solid oxygen generating granules of this invention.

EXAMPLE 1

90 g. lithium peroxide, (95 percent pure), 7 g. lithium chloride and 3 g. manganese sesquioxide (85 percent finer than 5 microns), were blended and mixed forming a uniform mixture. The blended mixture was compressed into briquettes having a density of 0.8 g/cm$^3$ and then broken into granules 4 by 14 mesh. The finished granules analyzed 80.1% lithium peroxide, 7.6% lithium chloride, 3% manganese sesquioxide, balance lithium carbonate, lithium hydroxide monohydrate and water.

The ability of the granules of Example 1 to absorb carbon dioxide and evolve oxygen was evaluated in the following manner. 10 g. of the absorbent granules of Example 1 were loaded into a glass tube, 12.5 cm. in length and 1.6 cm. in diameter, having a gas inlet and a gas outlet at opposing ends thereof. The entire glass tube was submerged in a constant temperature bath held at 25°C. and a gas mixture containing 1% carbon dioxide in helium was passed through the sample at a rate of one liter per minute. The relative humidity of the input gas was maintained at 80 percent, (21°C. dew point), by bubbling the gas through an appropriate saturated salt solution. A thermal conductivity cell calibrated to measure percent oxygen in helium was used to determine the amount of oxygen evolved. Another tube containing 10 g. of lithium peroxide was treated in a similar fashion and data comparing carbon dioxide absorbed and the oxygen evolved by the granules of Example 1 were obtained as follows:

Table I

| Time Min. | g $CO_2$ Absorbed | g $O_2$ Generated | Mole Ratio $CO_2$ Absorbed/ $O_2$ Generated |
|---|---|---|---|
| Lithium Peroxide (Uncatalyzed) | | | |
| 65 | 1.33 | 0.04 | 6.8 |
| 120 | 2.29 | 0.29 | 6.0 |
| Granules of Example 1 | | | |
| 34 | 0.65 | 0.179 | 2.6 |
| 71 | 1.34 | 0.437 | 2.24 |
| 122 | 2.40 | 0.887 | 1.97 |

The data in Table 1 shows that the oxygen generating granules of Example 1 generated about three times the amount of oxygen generated by lithium peroxide granules without lithium chloride during carbon dioxide absorption.

EXAMPLE 2

3 g. of lithium chloride and 7 g. of manganese sesquioxide were blended and mixed with sufficient water to dissolve the lithium chloride. The resultant slurry was dried at 120°C. under vacuum. The dried mixture was ground to 5 microns after which 10 g. of the mixture was blended and mixed with 90 g. of lithium peroxide. The blended mixture was compressed into briquettes having a density of 0.8 g/cm$^3$ and broken into granules 4 by 14 mesh. The finished granules analyzed 73.7% lithium peroxide, 5.7% lithium carbonate, 1.8% lithium hydroxide monohydrate, 8.6% water, 7% manganese sesquioxide and 3% lithium chloride.

Oxygen evolution from the granules of Example 2 was determined by measuring the gas volume change with the exposure of the granules in an open dish inside an airtight chamber maintained at a relative humidity of 100 percent. For sake of comparison, oxygen evolved from two other samples, one being granules prepared in the manner of Example 2 omitting the manganese sesquioxide (sample 2) and the other being granules prepared in the manner of Example 2 omitting the lithium chloride (sample 3) was measured in the same manner. Sample 1 (the granules of Example 2) evolved oxygen at a linear rate of 1.6 mg per g. of granules per hour for 170 hours. After 170 hours exposure the granules analyzed 2% lithium peroxide, 7.7% lithium carbonate, 77% lithium hydroxide monohydrate, 7.8% water, 3.8% manganese sesquioxide and 1.7% lithium carbonate. Samples 2 and 3 did not evolve any detectable levels of oxygen during the test.

Having thus described the invention, what is claimed is:

1. Solid, oxygen-generating granules for use in closed cycle life support systems comprising a mixture of
    lithium peroxide,
    a peroxide decomposition catalyst selected from the group consisting of a heavy metal or compound thereof, and
    a non-oxidizable, hygroscopic agent capable of forming a liquid phase in said granules upon the absorption of water vapor selected from the group consisting of cesium chloride, magnesium chloride, calcium chloride, lithium chloride, sodium hydroxide, potassium hydroxide and cesium hydroxide, said lithium peroxide being catalytically decomposed in said liquid phase with the evolution of oxygen and absorption of carbon dioxide and water vapor.

2. Oxygen-generating granules of claim 1 wherein said peroxide decomposition catalyst is present in an amount of from about 1 to about 10 percent; and said non-oxidizable, hygroscopic agent is present in an amount of from about 1 to about 10 percent; said percentages being by weight, based on the weight of said granules.

3. Oxygen-generating granules of claim 2 wherein said heavy metal decomposition catalyst is present in an amount of from about 3 to about 7 percent, and said non-oxidizable, hygroscopic agent is present in an amount of from about 3 to about 7 percent, said percentages being by weight, based on the weight of said granules.

4. Oxygen-generating granules of claim 1 wherein said peroxide decomposition catalyst is selected from the group consisting of nickel, tin, tungsten, zinc, manganese, cobalt, iron, lead, titanium and oxides of said metals.

5. Oxygen-generating granules of claim 4 wherein said peroxide decomposition catalyst is manganese sesquioxide.

6. Oxygen-generating granules of claim 1 wherein said hygroscopic agent is lithium chloride.

7. In the generation of oxygen from granules comprising catalyzed lithium peroxide during absorption of water vapor and carbon dioxide in a closed cycle life support system, the improvement which comprises incorporating in said granules a non-oxidizable, hygroscopic agent selected from the group consisting of cesium chloride, magnesium chloride, calcium chloride, lithium chloride, sodium hydroxide, potassium hydroxide and cesium hydroxide.

8. The method of claim 7 wherein from about 1 to about 10 percent, by weight, based on the weight of said granules, of said non-oxidizable, hygroscopic agent is incorporated in said granules.

9. The method of claim 7 wherein said hygroscopic agent is lithium chloride.

* * * * *

UNITED STATES PATENT OFFICE
CERTIFICATE OF CORRECTION

Patent No. 3,920,803                  Dated November 18, 1975

Inventor(s) Daniel A. Boryta

It is certified that error appears in the above-identified patent and that said Letters Patent are hereby corrected as shown below:

Col. 2, l. 2,    "abosrption" should be -- absorption --.

Col. 2, l. 4,    "abosrption" should be -- absorption --.

Col. 2, l. 7,    "solic" should be -- solid --.

Col. 4, l. 36,   "3H$_2$(g)" should be -- 3H$_2$O(g) --.

Col. 4, l. 37,   insert -- ( -- before "LiCl"

Col. 4, l. 46,   "respriation" should be -- respiration --.

Signed and Sealed this second Day of March 1976

[SEAL]

Attest:

RUTH C. MASON
*Attesting Officer*

C. MARSHALL DANN
*Commissioner of Patents and Trademarks*